United States Patent Office 3,299,098
Patented Jan. 17, 1967

3,299,098
PHENOXATHIINS AND THEIR PREPARATION
Walter Reifschneider, Midland, Mich., assignor to The Dow Chemical Company, Midland, Mich., a corporation of Delaware
No Drawing. Filed Mar. 7, 1966, Ser. No. 532,061
6 Claims. (Cl. 260—327)

This application is a continuation-in-part of my copending application Serial Number 205,511, filed June 27, 1962, now abandoned.

The present invention is directed to thioethers and in particular is directed to novel thioethers corresponding to the formula

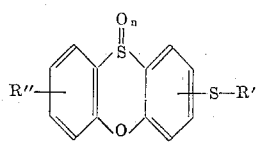

In the present specification and claims, any substituent R' represents a member of the group consisting of an alkyl group containing from 1 to 24, inclusive, carbon atoms, cycloalkyl of from 3 to 6, both inclusive, carbon atoms, and an aryl group containing from 6 to 15 carbon atoms, both inclusive; R" represents hydrogen or R' and $n$ is an integer from 0 to 2, inclusive. Thus the compounds of the present invention are alkylthio-, cycloalklthio-, and arylthio-phenoxathiins, and their -10-oxides and dioxides. In the present specification and claims the expression aryl refers to an aromatic hydrocarbon group which itself may bear loweralkyl substituent groups, including methyl, ethyl, propyl, butyl and hexyl and so forth. Loweralkyl herein means alkyl of from 1 to 6, both inclusive, carbon atoms.

The novel compounds are, at room temperature, oily liquids or crystalline solids usually appearing colorless or white, very slightly soluble in water but readily soluble in various common organic solvents such as lower alkanols, benzene and the like. The compounds are useful as insecticides and herbicides, various of them have distinct germicidal activity: as inhibitors of the germination of fungus spores, they are effective fungistats. They are also useful as intermediates in the preparation of dyestuffs and biologically active materials. As aquatic herbicides they kill Salvinia, Elodea, and Cabomba: they are useful to kill and control the blue-green algae, Chlorella.

The compounds are prepared by a progress which comprises the step of causing a reaction between a halophenoxathiin compound corresponding to the formula

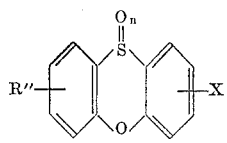

wherein X represents halogen, and a mercaptan compound corresponding to the formula

G—S—R' wherein G is hydrogen, an alkali metal, or cuprous copper. During the reaction to prepare the present compounds, one molecule of mercaptan reacts with each molecule of halophenoxathiin compound. Small amounts of mercaptan may be lost in side reactions. Thus, when it is desired to prepare the present compound in a high state of purity and with a minimum of post-synthesis purification procedure, the starting reactants should be employed in equimolecular proportions, or preferably, with the mercaptan in a slight excess. However, other portions may be employed if desired, and unconsumed starting material of whatever identity may, if desired, be recycled into further synthesis process.

The reaction goes forward at temperatures over a wide range, such as 20° to 350° C., but initiates most readily when heated to a temperature somewhat higher than room temperature, preferably from 100° to 250° C. Under these conditions the reaction is, in general exothermic and goes forward to completion with good yield calculated upon the basis of consumed starting material. When mercaptan is employed, hydrogen, halide of reaction is evolved and means for its orderly disposal are advantageously provided.

Typically, in the preparation of the compounds of the present invention, reaction between the mercaptan starting material and the phenoxathiin halide starting material will initiate and go forward only when there is employed, a catalytic amount of both a source of cuprous ion and nitrogenous base. Thus, in the preparation of many, and probably all of the present compounds, the employment of such catalyst is essential and critical, although the exact weight is not critical. The employment of such catalyst is in any case highly advantageous. The source of cuprous ion may be metallic copper, in which case the copper reacts in some way to obtain cuprous halide. Also, cuprous oxide may be employed as a source of cuprous ion in which case, when employing mercaptan, water of reaction is evolved and cuprous halide results. Cuprous chloride itself or other cuprous salt may be employed. The employed amount is not critical, but may vary from a very small trace amount, less than 1/100 of 1 molar percent, to as much as an amount equimolecular with either reactant or even greater. In general, the employment of larger amounts is accompanied by no major advantage and, being expensive, is not preferred.

The nitrogenous base may be ammonia, a primary, secondary, or tertiary aliphatic or aromatic amine or a nitrogenous heterocycle wherein the nitrogen acts, or is capable of acting, as a basic substance. If desired, the nitrogenous base may be a naturally liquid substance which is employed as a reaction medium. Otherwise, such base is dissolved in inert liquid reaction medium, such as an aromatic or aliphatic hydrocarbon.

It is preferred, in at least laboratory preparations, to employ the nitrogenous base catalyst substance in sufficient quantity that portions of it may act as hydrogen halide acceptor, portions may act as solvent, and yet further portions may continue to function, unreacted, in the necessary catalytic manner.

In carrying out the reaction to prepare the compounds of the present invention, the halophenoxathiin and the mercaptan compound are intimately mixed and blended, in any order and in desired amounts, with source of cuprous ion and nitrogenous base as hereinbefore described, and thereafter heated, to a temperature at which reaction takes place promptly. In one convenient method of practicing the present method, the reaction temperature may be the reflux temperature of the liquid reaction mixture. In this situation, heating may be continued at the boiling temperature of the reaction mixture and under reflux for a period of time to carry the reaction to completion.

Upon completion of the reaction, the desired compounds of the present invention are separated in manners which, in view of the teaching of the instant specification, will be evident to skilled chemists. In one such manner, the reaction mixture, hot from heating to the reaction temperature, is poured into a mixture of ice and concentrated hydrochloric acid whereupon a precipitate usually forms from which the desired product can be extracted as a solvent-soluble fraction. Representative extraction solvents include diethyl ether, chlorinated hydrocarbons, and benzene. In any event, the mixture resulting from reaction, or its solid component, is extracted with solvent, the solvent extract dried over an inert drying agent such as, for example, anhydrous potassium carbonate or the like; the solvent vaporized and removed and the remaining product vacuum distilled; or if solid, chilled or otherwise induced to crystallize and, if desired, recrystallized from a solvent such as a lower alkanol.

When production of the present compounds is to be carried out on an industrial scale, various other methods of separation and purification may be preferred, including, for example, centrifugation, decantation, vacuum distillation, and the like.

The following examples, without more, will enable those skilled in the art to practice the present invention.

*Example I.—8-tert-butyl-2-(methylthio)phenoxathiin*

A reaction mixture is prepared, consisting of 29.8 grams (0.1 mole) of 8-tert-butyl-2-bromophenoxathiin, 16 grams of cuprous oxide (technical grade) and a solvent-catalyst mixture consisting of 110 milliliters quinoline and 10 milliliters pyridine. The resulting reaction mixture is placed in a flask provided with gas inlet tube reaching beneath, the liquid surface and under reflux, the reflux condenser being equipped with a water trap. In this situation, the reaction mixture is heated at its reflux temperature (a pot temperature between approximately 200 and 240° C.) and thereinto is very slowly bubbled 7.2 grams (0.15 mole) methyl mercaptan as a gas. The addition is made at an average rate of about 0.025 mole per hour. At the end of this addition the resulting hot mixture is poured into a mixture of shaved ice and excess concentrated hydrochloric acid. As a result of these procedures, the ice melts and basic substances react with hydrochloric acid; in the resulting acidified water a precipitate forms. The precipitate is collected by filtration and is extracted with ether, the ether extract liquid being saved. This liquid is dried over a bed of anhydrous potassium carbonate which also neutralizes remaining traces of acidic substances; the resulting liquid is warmed to vaporize and remove ether solvent and obtain a yellowish oily 8-tert-butyl-2-(methylthio)phenoxathiin product having a molecular weight of 302.5.

In preparations essentially the same as the foregoing, employing 35.9 grams (0.1 mole) of 7-(2,2,4,4-tetramethylbutyl)-2-bromophenoxathiin, all other materials being the same as in the foregoing preparation, there is obtained a 7-(2,2,4,4-tetramethylbutyl)-2-(methylthio)phenoxathiin product. The product is a white, crystalline solid.

There is prepared a 6-n-tetracosyl-3-bromophenoxathiin and it is then caused to react according to the present invention with ethyl mercaptan to obtain a 3-(ethylthio)-6-n-tetracosyl phenoxathiin compound as a white crystalline solid. The compound is of moderate solubility in carbon disulfide.

*Example II.—2-(isopropylthio)phenoxathiin*

A mixture of 139.5 grams (0.5 mole) 2-bromophenoxathiin, 50 grams of the sodium salt of isopropyl mercaptan, 5 grams of cuprous bromide, 200 milliliters quinoline, and 100 milliliters technical 2,4-lutidine is stirred and heated under reflux for a period of 30 hours to carry to approximate completion a reaction between the bromophenoxathiin and the sodium mercaptide and prepare a 2-(isopropylthio)phenoxathiin product. The resulting reaction mixture containing the said product is then poured into a mixture of 200 milliliters concentrated hydrochloric acid and an abundance of thinly shaved ice. The ice melts and the acid neutralizes basic nitrogenous substances. A solid precipitate forms and is collected by filtration and from the resulting solid an ether extract product is made. The resulting ether solution is washed once with 10 percent hydrochloric acid and thereafter twice with excess 10 percent aqueous sodium hydroxide and is thereafter dried over anhydrous potassium carbonate. The ether is evaporated and the residual oily product fractionally distilled under gradually increasing temperatures and at subatmospheric pressures to obtain a 2-(isopropylthio)phenoxathiin product as a yellowish oil boiling at 156° C. under 0.3 millimeter mercury pressure. The product was tested and found to be highly effective as an ascaricide and also to be highly effective as an anthelmintic. In a representative operation, the inclusion for a period of 7 days of 0.25 percent by weight of the compound of the present example in the routine diet of a group of laboratory mice heavily infested with pathogenic parasitic ascarids resulted in an 83 percent reduction in the ascarid population with no mortality and no observed harmful effects upon the mice.

The compound is also useful as an aquatic herbicide and as a highly selective terrestrial herbicide.

In preparation essentially the same as the foregoing but employing as phenoxathiin starting compound 9-p-hexylphenyl-2-bromophenoxathiin monoxide and, optionally, ispropyl mercaptan or the alkali metal salt of isopropyl mercaptan there is obtained a 9-p-hexylphenyl-2-(isopropylthio)phenoxathiin monoxide compound.

Similarly, employing an 8-phenyl-2-chlorophenoxathiin starting material and cyclopentyl mercaptan (boiling at approximately 130° C.) there is obtained a 2-(cyclopentylthio)-8-phenylphenoxathiin.

*Example III*

In manner essentially similar to Example II foregoing, but employing 3-chlorophenoxathiin and tetracosyl mercaptan there is obtained a yellow crystalline solid 3-(tetracosylthio)phenoxathiin product.

Also, employing as starting phenoxathiin the compound 2-bromophenoxathiin-10,10-dioxide (of which the preparation is set forth in "Abstract of Doctoral Theses" (Southern Methodist University, Dallas), 1955–1956, by Eidt, page 397 and following) by reaction with cyclohexyl mercaptan there is obtained a 2-cyclohexylthiophenoxathiin-10,10-dioxide product.

*Example IV*

A reaction mixture was prepared, containing 75 grams 2-chlorophenoxathiin-10-oxide, 39 grams benezenthiol, 26 grams cuprous oxide, all dispersed together in 250 milliliters aniline and 500 milliliters 2,6-lutidine, the two latter substances being both nitrogenous base catalytic material and liquid reaction medium chosen for a convenient boiling temperature. The resulting reaction mixture was heated for a period of time under reflux and at the boiling temperature with stirring to carry to completion the reaction to prepare a 2-(phenylthio)phenoxathiin-10-oxide product. The yield of crude product was 61 grams of a substance melting in range of 81–86° C. The resulting product was a white crystalline solid. After recrystallization, the product had a melting temperature of 89.5–91° C. The recrystallized product was found to be useful as a fungicide, for example in the control of stem rust of wheat; and as an aquatic herbicide.

By reacting together 2-bromophenoxathiin and 1-naphthalenethiol (normally a liquid boiling at approximately 285° C. under atmospheric pressure) there is obtained a 2-(1-naphthylthio)phenoxathiin product as a white, crystalline solid.

Similarly, employing a starting o-i-propylbenzenethiol (a liquid boiling at approximately 226° C. under 730 millimeters mercury pressure) and the indicated halophenoxathiin there is obtained a 2-(2-i-propylphenylthio)phenoxathiin product.

*Example V*

In procedures essentially similar to the foregoing, employing 2-chlorophenoxathiin and benzenethiol, there is obtained a 2-(phenylthio)phenoxathiin compound melting at 57–59° C., having a molecular weight of 308.4, and being when recrystallized from solvent, a white, crystalline solid.

The compound of this example, 2-(phenylthio)phenoxanthiin, was tested in comparison with the compound of the prior art believed to be nearest the present invention, namely, 2-(phenoxy)phenoxathiin. This art compound is described at 59 Journal of the American Chemical Society, 2578. In purity in excess of 99 percent by weight, the art compound forms white needle crystals that melt at 81–82° C.

The test procedures, adjuvant substances, and test organism were alike in each test and, but for candidate toxicant compound, in the check which was run simultaneously. The tests were conducted in the following manner.

2-(phenoxy)phenoxathiin was dispersed in water to obtain an aqueous dispersion of the said compound of known concentration.

Separately, 2-(phenylthio)phenoxathiin was dispersed in water to obtain an aqueous dispersion of known concentration.

Each of these aqueous dispersions was then further dispersed in water to obtain aqueous dispersions each containing one said compound as sole toxicant, in the concentration of 10 parts of compound per million parts of total aqueous preparation.

The compounds thus dispersed were then tested as herbicides for the control of aquatic vegetation in the following manner:

A container was filled approximately full with an aqueous dispersion containing 2-(phenoxy)phenoxathiin as sole toxicant in the concentration of 10 parts of the said compound per million parts total dispersion. Into this container were then placed well developed, strong, healthy plants of Salvinia, Elodea and Cabomba.

A similar container was similarly filled with an aqueous dispersion containing, as sole toxicant, 2-(phenylthio)phenoxathiin in the concentration of 10 parts of said compound per million parts total dispersion and similar strong, well developed, heathly plants of Salvinia, Elodea and Cabomba, each species as a further portion of the same clone from which had been taken the earlier mentioned samples of the same plants; and they were placed in the said second container with the aqueous 2-(phenylthio)phenoxathiin dispersion.

Both containers, together with a third container having water and adjuvants identical with those employed in dispersing toxicant candidate compounds but with no toxicant, with Salvinia, Elodea and Cabomba from the same said clones growing in it, to serve as check, were placed under conditions generally favorable for the growth of the aquatic plants and maintained for a period of time.

At the end of approximately 380 hours, approximately 2 weeks, the containers were examied. In the container having 2-(phenylthio)phenoxathiin as sole toxicant in the water the Salvinia and Elodea were entirely dead and the Cabomba died in substantial parts, the remaining part being in poor condition, evaluated by a skilled botanist as 50 percent kill.

In the container in which the plants grew in water having 2-(phenoxy)phenoxathiin as sole toxicant the plants were apparently normal and healthy and growing well in all respects, closely comparable with the untreated check. The plants in the untreated check were in excellent condition.

The containers and contents were evaluated again at the end of 720 hours, and it was ascertained that the vegatation in the water containing 2-(phenoxy)phenoxathiin continued to grow normally and appeared healthy in all respects, closely comparable with the check group.

In further tests, 2-(phenoxy)phenoxathiin was dispersed in water in which was actively growing a vigorous culture of the blue-green algae Chlorella, to obtain an aqueous dispersion containing 1 part of the said compound as sole toxicant per million parts of aqueous Chlorella culture.

Similarly, 2-(phenylthio)phenoxathiin was dispersed in another portion of the same original Chlorella culture to obtain a second composition essentially identical with the first except that the sole toxicant was 2-(phenylthio)phenoxathiin in the concentration of 1 part of the said compound per million parts of aqueous Chlorella culture.

A third culture, similar but containing no toxicant candidate, was maintained with the two test cultures as a check. The cultures were maintained for one week under conditions generally favorable to the growth of Chlorella.

At the end of this time, the three cultures were examined to ascertain results. As a result of this test it was ascertained that in the check culture the Chlorella was growing strongly and apparently normal in all respects. In the culture containing 2-(phenoxy)phenoxathiin, the Chlorella was in a condition similar to that of the check, growing strongly and apparently normal in all respects. In the culture containing 2-(phenylthio)phenoxathiin the Chlorella was entirely dead.

In manner similar to the foregoing preparation of the present example, employing para-tertiary-butylbenzenethiol, there is obtained a 2-(para-tertiary-butylphenylthio) phenoxathiin product as a white crystalline solid having a molecular weight of 364.5.

The halophenoxathiin compounds employed as starting reactants in preparing the compounds of the present invention are readily prepared in various reactions known in the art. One of the more convenient and efficient of such reactions is that of Ferrario, published in the "Bulletin de la Societe Chimique," Fourth Series, volume 9, page 536 (1911). Substituents upon the phenyl ether ("diphenyl oxide") usually appear in the resulting phenoxathiin in the same position relative to the -oxy-linkage as they occupy in the starting ether.

The same method has been set forth in terms of modern laboratory practice by Suter and Maxwell: See "Organic Synthesis" (John Wiley & Sons, New York) volume 18, 1938, page 64. As noted by Ferrario and also by Suter and Maxwell, a desired product can be purified in good yield by recrystallization from solvent. Ferrario used ethanol whereas Suter and Maxwell used methanol. Other solvents may also be employed.

The substituted phenyl ethers are prepared in various methods. See for example, "Synthetic Organic Chemistry" (Wiley, New York), 1953, by Wagner and Zook, notably chapter 6.

I claim:
1. Compound corresponding to the formula

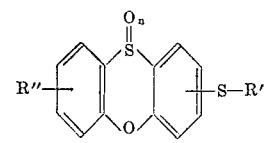

wherein R′ represents a member of the group consisting of an alkyl group containing from 1 to 24, inclusive, carbon atoms; cycloalkyl; an aryl group containing from 6 to 15 carbon atoms, inclusive, R″ represents hydrogen or R′, and $n$ is an integer from 0 to 2, inclusive.

2. Compound of claim 1 which is 2-(isopropylthio) phenoxathiin.

3. Compound of claim 1 which is 2-(phenylthio)phenoxathiin-10-oxide.

4. Compound of claim 1 which is 2-(cyclohexylthio) phenoxathiin-10,10-dioxide.

5. Compound of claim 1 which is 2-(phenylthio)phenoxathiin.

6. A method of preparing a compound corresponding to the formula

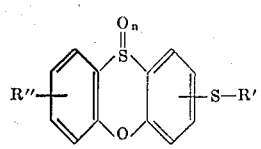

which comprises the step of causing a reaction in the presence of a catalytic amount of both a source of cuprous ion and a nitrogenous base between a halophenoxathiin corresponding to the formula

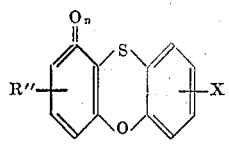

wherein X represents halogen, and a mercaptan corresponding to the formula $$G-S-R'$$

wherein R' represents a member of the group consisting of alkyl containing from 1 to 24, inclusive, carbon atoms, cycloalkyl, an aryl group containing from 6 to 15 carbon atoms, inclusive; R" represents R' or hydrogen, G represents a member of the group consisting of hydrogen, alkali metal, and cuprous copper; and $n$ represents an integer from 0 to 2, inclusive.

No references cited.

WALTER A. MODANCE, *Primary Examiner.*

J. A. PATTEN, *Assistant Examiner.*

UNITED STATES PATENT OFFICE
CERTIFICATE OF CORRECTION

Patent No. 3,299,098  January 17, 1967

Walter Reifschneider

It is hereby certified that error appears in the above numbered patent requiring correction and that the said Letters Patent should read as corrected below.

Column 7, lines 12 to 15, the formula should appear as shown below instead of as in the patent:

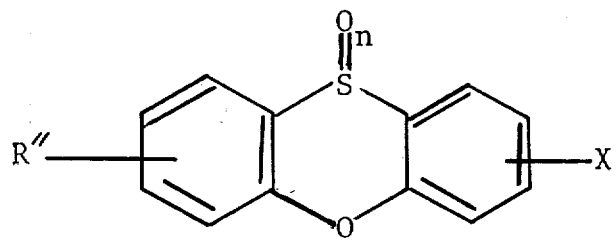

Signed and sealed this 24th day of October 1967.

(SEAL)
Attest:

EDWARD M. FLETCHER, JR.
Attesting Officer

EDWARD J. BRENNER
Commissioner of Patents